United States Patent Office 2,714,095
Patented July 26, 1955

2,714,095

MAGNESIUM BOROARSENATE PHOSPHOR

Yoshimasa Kobuke, Shinagawa-Ku, Tokyo, and Yasuo Uehara, Ota-Ku, Tokyo, Japan, assignors to Tokyo Shibaura Electric Co., Ltd., Kawasaki-Shi, Kanagawa-Ken, Japan No Drawing. Application January 25, 1954, Serial No. 406,048

Claims priority, application Japan February 3, 1953

4 Claims. (Cl. 252—301.4)

This invention relates to a phosphor and particularly to magnesium boroarsenate phosphor which emits highly efficient deep red fluorescence when excited by ultra-violet rays, short wave visible rays or cathode ray.

M. Travnicek, F. A. Kroeger, Th. P. J. Botden and P. Zahn ("Physica," January 1952, pp. 33–42) reported magnesium arsenate phosphor whose ground material is a compound containing magnesium- and arsenic oxide and which contains manganese as an activator. This phosphor is obtained by firing a mixture of proper amounts of MgO, $As_2O_5$ and $MnCO_3$ for 24 to 70 hours at 1100° C. in an oxidizing atmosphere; its ground material has a composition of $6MgO \cdot As_2O_5$ and, when the amount of the activator manganese is 0.01 mol against 1 mol of the ground material, it emits highly efficient deep red fluorescence by the excitation of ultra-violet rays. However, it has disadvantages that, if the atmosphere in firing is not oxidizing, it will emit green fluorescence and that, unless the mixture is fired for such a long time as more than 24 hours as mentioned above, the efficiency of the fluorescence will not be sufficient.

The present invention relates to a phosphor which does not have such disadvantages as are mentioned above.

An object of the present invention is to obtain a phosphor which emits deep red fluorescence of such high efficiency as will reach a quantum yield of more than 0.9 in the wave length range of about 2000 to 4600 Å.

Another object of the present invention is to obtain a phosphor which emits highly efficient deep red fluorescence, by firing for such a short time as 15 minutes to an hour at a temperature of 1100° C.

A further object of the present invention is to provide a phosphor which emits fluorescence of red color when employed alone and emits a red component of fluorescence when mixed with one or more other phosphors, when applied to low pressure fluorescent lamps, high pressure mercury fluorescent lamps, or fluorescent signs.

A still further object of the present invention is to provide a phosphor which can also be used as a phosphor for cathode ray tubes when used alone or in mixture with other phosphor, because deep red fluorescence can be emitted by excitation of cathode ray.

The present invention relates to a phosphor whose ground material is a compound containing the three elements magnesium, arsenic and boron and which contains manganese as an activator. The ground material is represented as $mMgO \cdot As_2O_5 \cdot nB_2O_3$ and is utilized in the range of $m=4$ to 8 and $n=0.8$ to 0.05. The optimum result is obtained when $m$ and $n$ stand for about 6 and 0.4, respectively, in the formula. A magnesium compound such as magnesium oxide (MgO), magnesium carbonate ($MgCO_3$) or magnesium nitrate $[Mg(NO_3)_2 \cdot 6H_2O]$ can be used as source of the MgO. An arsenic compound such as arsenic trioxide ($As_2O_3$) or arsenic pentoxide ($As_2O_5$) can be used as source of the $As_2O_5$. A boron compound such as boric acid ($H_3BO_3$), boron oxide ($B_2O_3$) or ammonium tetraborate $[(NH_4)_2B_4O_7 \cdot 2H_2B_2O_4 \cdot 4H_2O]$ can be used as source of the $B_2O_3$. Any magnesium salt such as sulfate, nitrate, carbonate or chloride can be used for the material of the activator manganese.

The inventors of the present invention measured the efficiency of fluorescence of the magnesium arsenate phosphor obtained by varying the ratio of magnesium oxide to arsenic pentoxide and the added amount of manganese between 0.005 and 0.2 mol for arsenic pentoxide and by then firing the mixture for one hour and found, as a result, that the brightest fluorescence was emitted in the case where the proportion of magnesium oxide to arsenic pentoxide was 6 to 1 and the amount of manganese was about 0.01 mol. However, its intensity of fluorescence is less than one half of that of the phosphor of the present invention and its efficiency of fluorescence decreases remarkably by the irradiation of ultra-violet rays when applied to fluorescent lamps.

According to the present invention, a phosphor is obtained by adding a manganese compound to respective proper amounts of a magnesium compound, an arsenic compound and a boron compound, thoroughly mixing and crushing the mixture and firing it for an hour at 1100° C. The present phosphor emits highly efficient deep red fluorescence having a quantum yield of about 0.9 and yet it is very stable under the irradiation of ultra-violet rays. The suitable amount of the activator manganese may be 0.01 to 0.2 mol, and preferably about 0.05 mol. The optimum proportion of $B_2O_3$ is about 0.4 mol.

In order to have those skilled in the art understand the present invention, we show examples in the following. However, this invention should not be limited to these examples.

EXAMPLE 1

A mixture of 6 mols of magnesium nitrate, 1 mol of arsenic trioxide, 0.1 mol of ammonium tetraborate (corresponding to 0.4 mol of $B_2O_3$) and 0.1 mol of manganese chloride was made pasty with the addition of a proper amount of distilled water and was heated while being well stirred and dried.

After this mixture was thoroughly crushed, it was inserted into an electric furnace and fired for 30 minutes at 1100° C. The product was taken out and cooled in air. The steps may be repeated, if necessary.

The phosphor thus obtained emitted deep red bright fluorescence under excitation by ultra-violet rays within the range of wave lengths of about 2000 to 4600 Å.

EXAMPLE 2

When a mixture of 8 mols of magnesium nitrate, 1 mol of arsenic trioxide, 0.05 mol of ammonium tetraborate (corresponding to 0.2 mol of $B_2O_3$) and 0.05 mol of manganese sulfate was treated just as in Example 1, a phosphor emitting the same deep red bright fluorescence as the phosphor of Example 1 was obtained.

EXAMPLE 3

When a mixture of 5 mols of magnesium carbonate, 1 mol of arsenic trioxide, 0.025 mol of ammonium tetraborate (corresponding to 0.1 mol of $B_2O_3$) and 0.01 mol of manganese sulfate was treated just as in Example 1, a phosphor emitting the same deep red bright fluorescence as the phosphor of Example 1 was obtained.

EXAMPLE 4

When a mixture of 6 mols of magnesium nitrate, 1 mol of arsenic trioxide, 0.05 mol of ammonium tetraborate and 0.1 mol of manganese chloride with the addition of 0.2 mol of lithium fluoride as a flux was treated just as in Examples 1 to 4, a phosphor emitting the same deep red bright fluorescence was obtained.

EXAMPLE 5

Even when 0.2 mol of zirconium oxide was employed in place of lithium fluoride in Example 4, the same phosphor as of Example 4 was obtained.

EXAMPLE 6

Even when 0.2 mol of ammonium vanadate was employed in place of lithium fluoride in Example 4, the same phosphor as of Example 4 or 5 was obtained.

As shown in Examples 4 to 6, an alkaline metal compound, a zirconium compound or a vanadium compound can be used as a flux for the phosphor of the present invention. It is also clear from what is mentioned above that these compounds can be used alone or in admixture. On the other hand, the slightest amount of a compound of cadmium, antimony, bismuth, silicon, titanium, iron, tungsten, molybdenum or tin would reduce the efficiency of fluorescence.

The results of X-ray analysis by the powder method made by the present inventors in order to prove that the magnesium boroarsenate phosphor of the present invention is a new compound different from magnesium arsenate phosphor are shown in Table I.

*Table I*

| Magnesium arsenate phosphor | | | | Magnesium boroarsenate phosphor | | |
|---|---|---|---|---|---|---|
| (T. K. B. Z) | | (Uehara and Kobuke) | | (Uehara and Kobuke) | | |
| Lattice spacing (Å.) | Intensity | Lattice spacing (Å.) | Intensity | Lattice spacing (Å.) | Intensity | |
| | | | | | Specimen (a) | Specimen (b) |
| | | | | 6.60 | 0.1 | 1 |
| | | | | 5.71 | 0.5 | 3 |
| 5.05 | 7 | 5.17 | 7 | 5.15 | 7 | 8 |
| 4.42 | 0.7 | 4.55 | 0.5 | 4.67 | 2 | 7 |
| 4.12 | 0.3 | 4.218 | 1 | 4.224 | 4 | 8 |
| 3.74 | 10 | 3.840 | 10 | 3.820 | 10 | 10 |
| | | 3.349 | 1 | 3.349 | 3 | 6 |
| | 2 | 3.196 | 0.5 | 3.196 | 1 | 1 |
| 2.98 | 4 | 3.037 | 5 | 3.037 | 8 | 8 |
| 2.85 | 4 | 2.888 | 5 | 2.885 | 6 | 2 |
| | | | | 2.794 | 6 | 7 |
| 2.58 | 4 | 2.615 | 6 | 2.619 | 6 | 1 |
| 2.50 | 7 | 2.535 | 6 | 2.532 | 7 | 1 |
| 2.41 | 4 | 2.451 | 4 | 2.449 | 5 | 0.5 |
| 2.35 | 6 | 2.375 | 6 | 2.373 | 7 | 4 |
| | | 2.318 | 0.5 | 2.326 | 1 | 2 |
| 2.25 | 1 | 2.269 | 1 | 2.268 | 1 | 3 |
| | | 2.180 | 0.5 | 2.188 | 1 | 3 |
| 2.07 | 7 | 2.093 | 9 | 2.091 | 9 | 7 |
| | | | | 2.071 | 0.5 | 0.5 |
| 1.95 | 0.8 | 1.972 | 2 | 1.973 | 2 | 0.5 |
| 1.88 | 0.6 | 1.902 | 1 | 1.901 | 1 | 0.5 |
| 1.84 | 1.8 | 1.865 | 3 | 1.876 | 3 | 2 |
| 1.79 | 1.5 | 1.812 | 2.5 | 1.815 | 3 | 2 |
| | | | | 1.782 | 1 | 2 |
| 1.73 | 0.7 | 1.753 | 1.5 | 1.743 | 2 | 0.5 |
| 1.70 | 1.7 | 1.722 | 3 | 1.719 | 3 | 0.5 |
| | | | | 1.693 | 3 | 2 |
| | | 1.683 | 2.5 | 1.676 | 3 | 2 |
| 1.62 | 1.8 | 1.646 | 2.5 | 1.640 | 3 | 0.5 |
| 1.60 | 2.7 | 1.612 | 4 | 1.609 | 5 | 2 |
| 1.56 | 1.8 | 1.573 | 2 | 1.574 | 3 | 0.5 |
| 1.54 | 1.7 | 1.554 | 2 | 1.553 | 3 | 2 |
| 1.50 | 6 | 1.551 | 8 | 1.514 | 8 | 8 |
| 1.43 | 5 | 1.442 | 8 | 1.443 | 8 | 8 |
| | | 1.406 | 3.5 | 1.406 | 4 | 3 |
| | | | | 1.382 | 2 | |
| | | 1.367 | 0.5 | | | |
| | | | | 1.357 | 2 | |
| | | 1.346 | 0.5 | | | |
| | | | | 1.337 | 1 | |
| | | 1.324 | 1 | | | |
| | | 1.303 | 1 | 1.304 | 1 | |
| | | 1.285 | 0.2 | 1.283 | 2 | |
| | | 1.267 | 0.5 | 1.267 | 2 | |
| | | 1.260 | 2 | | | |
| | | 1.223 | 1.5 | 1.223 | 4 | |
| | | | | 1.202 | 2 | |
| | | | | 1.174 | 3 | |

The specimen of magnesium arsenate phosphor used for measurement in Table I is prepared by firing the mixture which corresponds to $6MgO \cdot As_2O_5$ for one hour at 1100° C. It is certain from the coincidence, within the range of errors permissible in measurement, of the values of the intensity distribution shown in columns 2 and 4 in Table I that the specimen of magnesium arsenate phosphor was a compound having the same crystal structure as that of the magnesium arsenate phosphor which said authors, namely, Travnicek, Kroeger, Botden and Zahn, had obtained by firing the mixture for 24 to 70 hours. The results of measurement by the above four authors are given in columns 1 and 2, the initials T. K. B. Z. being of said four authors. The measured values of the above-mentioned specimens are given in columns 3 and 4, Uehara and Kobuke being the names of the inventors. The intensities given by said Uehara and Kobuke are the visual intensities of the X-ray pattern.

Specimens (a) and (b) of the phosphor of the present invention in said table were prepared so as to have compositions $6MgO \cdot As_2O_5 \cdot 0.2B_2O_3$ and $6MgO \cdot As_2O_5 \cdot 0.8B_2O_3$ respectively, by firing for one hour at 1100° C.

In comparing the intensity distributions in column 4 with those in columns 6 and 7 in Table I, it is certain that magnesium arsenate phosphor and magnesium boroarsenate phosphor are compounds of different modifications belonging to the same crystal system. Thus, magnesium arsenate and magnesium boroarsenate coincide with each other in the positions of most interference lines of X-ray pattern and are remarkably different in the intensity distribution of the X-ray pattern.

Thus, it has been confirmed that the magnesium boroarsenate of the present invention is a new compound so far quite unknown. The magnesium boroarsenate phosphor of this invention has a high fluorescent efficiency more than twice that of magnesium arsenate phosphor when fired for a short time, such as 30 to 60 minutes, under the same condition and is technically very excellent as a stable phosphor.

What we claim is:

1. A phosphor whose ground material is a compound containing the three elements magnesium, arsenic and boron and corresponding to $mMgO \cdot As_2O_5 \cdot nB_2O_3$, wherein $m=4$ to 8 and $n=0.8$ to 0.05, and which contains manganese as an activator.

2. A phosphor according to claim 1 whose ground material is a compound represented by $mMgO \cdot As_2O_5 \cdot nB_2O_3$, wherein $m=4$ to 8 and $n=0.8$ to 0.05, and which contains 0.01 to 0.2 mol of manganese as an activator for the arsenic pentoxide in said ground material.

3. A phosphor according to claim 2, which contains about 0.05 mol of manganese as activator.

4. A phosphor corresponding to $6MgO \cdot As_2O_5 \cdot 0.2B_2O_3$ containing 0.2 mol of manganese as activator.

References Cited in the file of this patent

FOREIGN PATENTS 672,172    Great Britain _____ May 14, 1952